United States Patent [19]
Hogan

[11] Patent Number: 5,597,275
[45] Date of Patent: Jan. 28, 1997

[54] TOOL WITH CHANGEABLE WORKING TIP

[76] Inventor: Scott H. Hogan, 469 Heritage Dr., Bountiful, Utah 84010

[21] Appl. No.: 411,987

[22] Filed: Mar. 28, 1995

[51] Int. Cl.$^6$ .............................. B23B 45/00; B23B 31/10
[52] U.S. Cl. ..................... 408/239 R; 81/438; 81/490; 279/89; 279/93; 408/226; 408/241 R
[58] Field of Search ................... 408/226, 239 R, 408/239 A, 241 R; 279/89, 93; 81/490, 438; 433/128

[56] References Cited

U.S. PATENT DOCUMENTS

| | | | |
|---|---|---|---|
| 256,050 | 4/1882 | Richmond | 279/89 |
| 1,765,362 | 6/1930 | Berry | 279/145 |
| 2,231,252 | 2/1941 | Chesterman | 279/93 |
| 4,176,991 | 12/1979 | Egli | 408/239 R |
| 4,572,038 | 2/1986 | Graham | 81/439 |
| 4,588,335 | 5/1986 | Pearson, Jr. | 408/239 R |
| 4,716,796 | 1/1988 | Corona et al. | 81/490 |
| 5,190,422 | 3/1993 | Lechot | 408/239 R |

FOREIGN PATENT DOCUMENTS

356449  12/1931  United Kingdom ............ 279/89

*Primary Examiner*—Steven C. Bishop
*Attorney, Agent, or Firm*—Mallinckrodt & Mallinckrodt

[57] ABSTRACT

A tool with changeable working tips has a tool shaft with an attachment end adapted to receive the attachment end of a working tip in freely removable engagement therewith. A sleeve is moved over the engagement of the shaft and working tip to securely hold the shaft and working tip together in engaged position so that any rotation or other movement of the shaft is transferred to the working tip. The sleeve is removable from around the engagement ends of the shaft and working tip, such as by removal from the tool or retraction into the tool, to allow the working tip to be removed from engagement with the shaft and a different working tip to be engaged with the shaft. The sleeve is replaced over the engagement of the engagement ends to hold the different working tip in place.

24 Claims, 8 Drawing Sheets

TOOL WITH CHANGEABLE WORKING TIP

BACKGROUND OF THE INVENTION

1. Field

The invention is in the field of securing working tips to tools such as power drills or screwdrivers so that the tool with working tip secured may be manipulated or rotated to perform a desired task, and the tip may be easily and quickly changed so that the tool can perform other tasks.

2. State of the Art

Various tools provide interchangeable working tips. Power tools such as power drills generally include chucks which allow tips, such as drills, of a wide range of sizes to be secured in working position in the drill. However, chucks are relatively large, heavy, and expensive compared to the rest of the drill and because of the size and weight of the chucks, power drills and other tools using chucks are often designed around the chuck to maintain proper balance and feel of the drill or other tool. Further, chucks can be difficult to use and tighten properly to securely and safely hold a bit or other tip in place in the chuck. Bits often become loose in a chuck during use and sometimes even separate from a chuck during use.

U.S. Pat. No. 4,572,038 shows a tool having a plurality of working tips, such as screwdriver tips or drills, housed in compartments in a cylinder which is rotated to align the desired tip with the tool shaft. The tool shaft is retracted from the cylinder during selection of a tip to allow rotation of the cylinder to align the desired tip with the tool shaft. As a tip comes into alignment with the tool shaft during rotation of the cylinder, it engages the tool shaft. When the desired tip is aligned, and therefore engaged with the shaft, the shaft is extended through the cylinder so that the end of the working tip extends from the end of the tool. The engaged ends of the tip and shaft are maintained in a sleeve which holds the engagement during use of the tool and under various torque and other loads.

The tool of U.S. Pat. No. 4,572,038 may be used as a hand tool, as an attachment to a power tool such as a power drill or screwdriver, or incorporated into a power tool. The advantage of such a tool is that it is fast and easy to change tips between the limited number of preselected available tips by merely retracting the shaft, turning the cylinder to align the desired tip, and then again extending the shaft. This is much easier and faster than opening a chuck, removing a tip, inserting a new tip, and retightening the chuck. The problem with the tool of the cited patent is that the cylinder can be made to accommodate only a limited number of preselected tips. The number of preselected tips available in a particular tool is limited by the practical size of the cylinder to generally between about six to twelve preselected tips. Use of such a tool is limited by the particular preselected tips which come with the tool. A user cannot generally select particular tips to be available in a tool and cannot change the preselected selection of tips in such a tool, or replace a worn or damaged tip, without completely disassembling the tool. This is normally difficult and time-consuming. Because such tools are not designed for a user to change the selection of preselected tips, tips are not available separately for use with such tools.

SUMMARY OF THE INVENTION

According to the invention, working tips for a tool having a shaft with a working tip at an end thereof, such as a screwdriver or hand or power drill, may be easily changed by providing an engagement end on the tool shaft and a mating engagement end on the tip, and a sleeve to surround the mating engagement ends to hold them in engaged position. The sleeve may be removed from around the engagement ends when desired to allow disengagement of an engaged tip and engagement of a different tip. The invention eliminates the need for a chuck to hold a working tip and when used with a tool such as shown in cited U.S. Pat. No. 4,572,038 having a plurality of preselected tips stored in the tool, allows easy user selection and replacement of such stored tips.

In one embodiment of the invention, a tool, such as a power drill or screwdriver, has a shaft extending therefrom which terminates in an engagement end adapted to be engaged by a working tip. A sleeve is removably attached to the tool to surround and extend beyond the end of the shaft extending from the tool so as to surround a portion of a working tip engaged by the engagement end of the shaft to thereby hold the working tip in engagement with the shaft during use of the tool. If it is desired to change the working tip, the sleeve is removed from the tool to expose the engagement end of the shaft and allow the working tip to be removed therefrom. Another tip is placed into engagement with the engagement end of the shaft and the sleeve moved over the engagement end of the shaft to surround the engagement end of the shaft and mating engagement end of the tip and is secured in that position to the tool. The sleeve holds the engaged ends of the working tip and shaft together while the tool is in use. The sleeve may be provided with tabs which flex to move over a shoulder and then extend into receiving openings so that the tabs engage the shoulders to hold the sleeve in place on the tool. The tabs are flexed by a user to slide over the engagement shoulders when the sleeve is removed. Alternately, the sleeve could have a bayonet-type attachment to the tool or be threaded and screwed onto the tool.

Rather than making the sleeve removable from the tool to expose the engagement end of the shaft, the sleeve can be retractably mounted in the tool so that the sleeve can be retracted into the tool when desired to change a tip to expose the engagement end of the shaft. With such an arrangement, the sleeve can be spring-loaded so that it is biased to an extended position in which it surrounds the engagement end of the shaft and mating engagement end of the attached working tip, but can be pushed into the tool against the bias of the spring to expose the engagement end of the shaft when the working tip is to be changed. When the new tip is engaged, the sleeve is then released or extended back into its extended position covering once again the engaged ends of the working tip and shaft.

Various engagements or connections between the shaft and tip can be used such as a tongue and groove arrangement as shown in referenced U.S. Pat. No. 4,572,308 wherein the engagement end of the shaft includes a groove into which a tongue on the engagement end of a tip is inserted so that with the sleeve surrounding the tongue and groove connection, the working tip is securely held to the tool shaft, with rotation of the shaft causing rotation of the working tip. The tongue and groove arrangement prevents relative axial movement of the working tip with respect to the shaft while the sleeve prevents lateral movement of the working tip with respect to the shaft to thereby maintain the tongue in the groove to maintain the connection. Alternately, the shaft and working tip could be held against both lateral and axial movement by the sleeve and the engagement of the shaft and working tip merely transmits rotation. In such case, the sleeve may be hinged to open rather than merely slide along the shaft in order to release and change the working tip.

In a variation of the tool, the shaft can be retractable so that the shaft and working tip is retracted into the tool to allow release or removal of the sleeve, the shaft and tip are extended after sleeve removal to allow the tip to be changed, the shaft and new tip are retracted into the tool to allow the sleeve to be replaced, and the shaft and tip are extended through the sleeve to working position. With such an arrangement, the sleeve can be attached to the tool in a manner to insure that it cannot be removed during operation of the tool, or the tool can be provided with a cylinder as in referenced U.S. Pat. No. 4,572,038 for normally used tip storage and tip changing in the field, with the tips stored in the cylinder being easily replaced or changed when necessary or desired through removal of the sleeve and replacement as described above.

The invention can be used with a variety of both power and hand tools.

THE DRAWINGS

The best mode presently contemplated for carrying out the invention is illustrated in the accompanying drawings, in which.

DETAILED DESCRIPTION OF THE ILLUSTRATED EMBODIMENTS

Figures 1, 2, 3, 4:
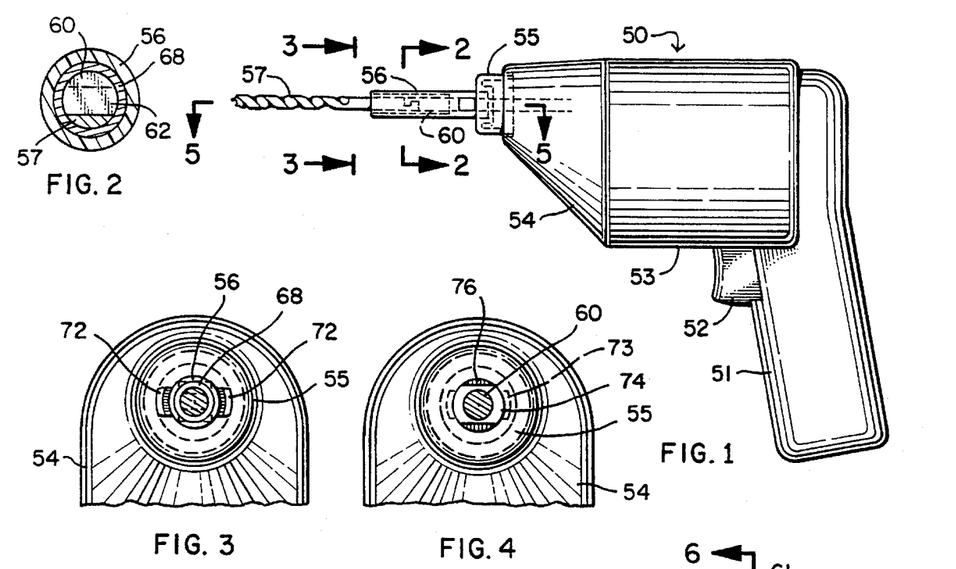
FIG. 1, is a side elevation of a power drill having a working tip attachment system of the invention.
FIG. 2, a vertical section taken on the line 2—2 of FIG. 1 through the joint of the drill shaft and working tip.
FIG. 3, a vertical section taken on the line 3—3 of FIG. 1.
FIG. 4, a vertical section similar to that of FIG. 3, but showing the sleeve removed.

In a basic embodiment of the invention, a power drill 50, FIG. 1, having a handle 51, trigger switch 52, and body 53 with tapered front end 54, has a front adapter 55, shown as screwed into the front of tapered front end 54. Sleeve 56 is removably secured to front adaptor 55 and extends forwardly therefrom. A working tip, shown as drill bit 57, extends from the forward end of sleeve 56. Power drill 50 includes a shaft 60 extending through a forward bearing 61, FIG. 5, and forwardly through front adaptor 55, FIGS. 5 and 8. The forward or engagement end of shaft 60 is cut-away to form a tongue 62 and groove 63. The rearward or engagement end of drill bit 57 forming the working tip for the power drill 50 similarly is cut-away to form a tongue 64 and groove 65. The respective tongues and grooves are sized and configured to interengage one another so that shaft tongue 62 fits into working tip groove 65 and working tip tongue 64 fits into shaft groove 63. With this engagement, rotation of shaft 60 is transmitted to drill bit 57 so the two will rotate together and working tip 57 (drill bit) is held against axial movement, i.e., movement forwardly or rearwardly, with respect to shaft 60. However, unless the engagement ends of shaft 60 and working tip 57 are held together in engagement, the two will fall apart as the working tip 57 moves laterally or radially with respect to the shaft 60.

Figures 5, 6, 7, 8, 9:
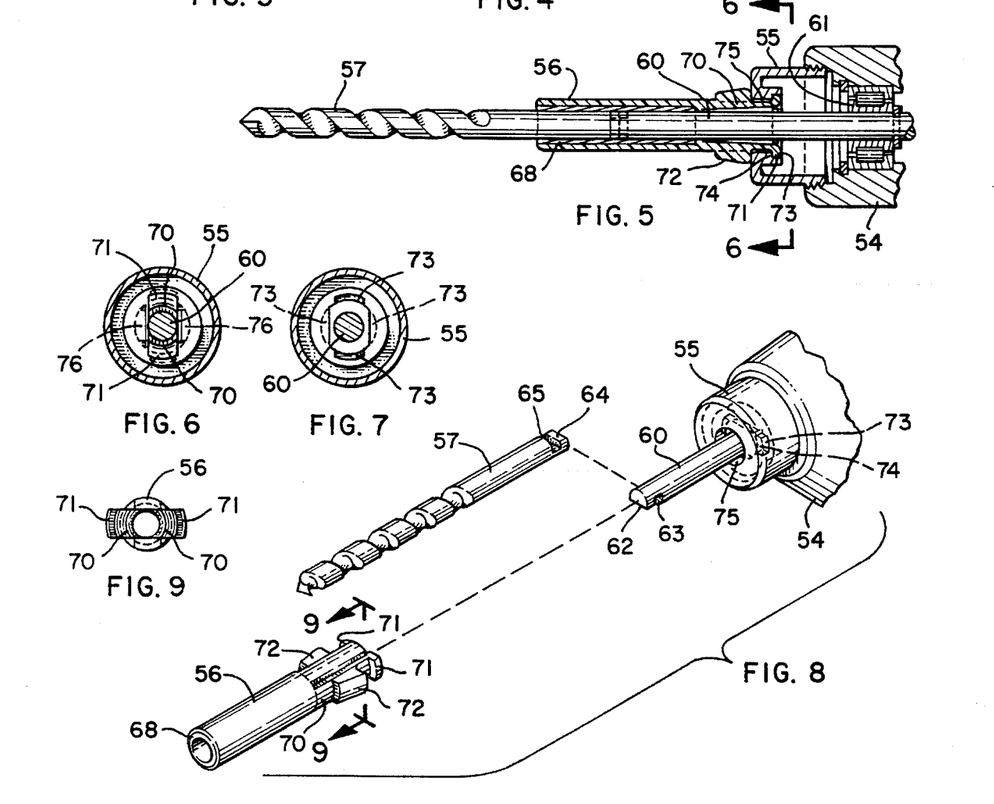
FIG. 5, a transverse horizontal section taken on the line 5—5 of FIG. 1.
FIG. 6, a vertical section taken on the line 6—6 of FIG. 5.
FIG. 7, a vertical section similar to that of FIG. 6, and showing the sleeve removed.
FIG. 8, an exploded assembly view of the front of the drill of FIG. 1 showing how the working tip and sleeve are engaged.
FIG. 9, a vertical section taken on the line 9—9 of FIG. 8.

In order to hold the working tip 57 in engagement with shaft 60, sleeve 56 is positioned to surround the engagement ends of shaft 60 and working tip 57, as shown in FIGS. 1 and 5. With sleeve 56 surrounding the engaged engagement ends of shaft 60 and working tip 57, the two are held securely in engaged position with relative lateral movement substantially prevented. Preferably sleeve 56 will include an inner sleeve 68, FIG. 5, of a hardened bearing material against which the shaft and working tip can rotate.

Although sleeve 56 may be removably secured to the forward portion of the drill body in various ways, in the embodiment illustrated in FIGS. 1–8, sleeve 56 includes opposite, rearwardly extending tabs 70 formed of deformable, normally shape-retaining material, such as a plastic material. Tabs 70 include rearward, outwardly extending walls 71 and operating pads 72 spaced forwardly therefrom. Front adapter 55 includes receiving recesses 73 which form shoulders 74. In securing a working tip to the tool shaft, the tongue 64 and groove 65 of working tip 57 are interengaged with tongue 62 and groove 63 of shaft 60. Sleeve 56 is slid over working tip 57 (it could be positioned over the forward part of tip 57 when tip 57 is engaged with shaft 60) and slid over the interengaged ends. A user squeezes operating pads 72 toward one another to move tabs 70 and walls 71 inwardly to clear shoulder 74 as the ends of tabs 70 are moved into opening 75 in front adapter 55 surrounding shaft 60 so that walls 71 move into alignment with recesses 73. The operating pads 72 are released to allow the tabs to move outwardly and walls 71 to move into recesses 73 behind shoulders 74 to lock sleeve 56 in place. Stops 76, FIGS. 4 and 7, require tabs 70 to be aligned with recesses 73 during insertion into opening 75 and when walls 71 are positioned in recesses 73, prevent rotation of sleeve 56. As seen in FIG. 5, tabs 70 normally extend outwardly from shaft 60 as they extend rearwardly so that they can be moved inwardly a sufficient distance for walls 73 to clear shoulders 74 during insertion or removal of the sleeve along shaft 60.

When an attached working tip is to be removed or changed, a user squeezes operating pads 72 inwardly and pulls the sleeve away from the drill body to expose the interengaged ends of the shaft and working tip. The working tip is changed and the sleeve replaced.

Figures 10, 11, 12, 13, 14, 15, 16, 17, 18, 19, 20, 21:
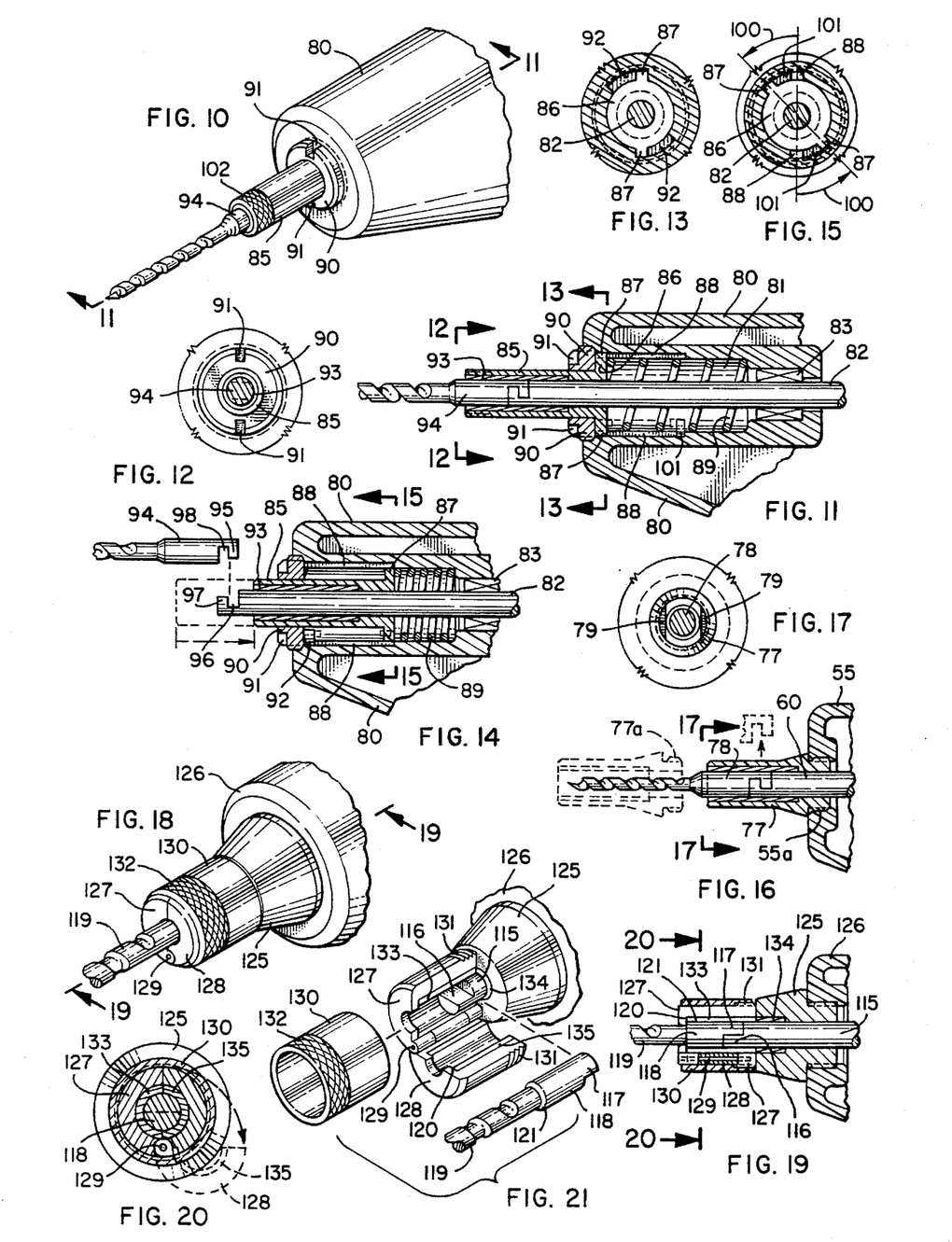
FIG. 10, a perspective view of the front of a power drill showing a retractable sleeve embodiment of the invention.
FIG. 11, a fragmentary vertical section taken on the line 11—11 of FIG. 10.
FIG. 12, a vertical section taken on the line 12—12 of FIG. 11.
FIG. 13, a vertical section taken on the line 13—13 of FIG. 11.
FIG. 14, a fragmentary vertical section similar to that of FIG. 11, but showing the sleeve in retracted position to allow a working tip to be changed.
FIG. 15, a vertical section taken on the line 15—15 of FIG. 14.
FIG. 16, a fragmentary vertical section through the front of a power drill showing a further embodiment of the invention.
FIG. 17, a vertical section taken on the line 17—17 of FIG. 16.
FIG. 18, a perspective view of the front of a power drill showing a split sleeve embodiment of the invention.
FIG. 19, a fragmentary vertical section taken on the line 19—19 FIG. 18.
FIG. 20, a vertical section taken on the line 20—20 of FIG. 19.
FIG. 21, a perspective assembly view of the embodiment of FIG. 18 showing the sleeve in open position to allow a working tip to be changed.

Instead of a snap fit of the sleeve into the forward end of a drill, the sleeve could be threaded into the forward end of the drill. Thus, as shown in FIGS. 16 and 17, the front adapter 55 may be internally threaded around shaft 60, as at 55a, and a sleeve 77, provided with a matingly threaded end portion 77a, screwed into front adapter 55 to surround the engagement of shaft 60 with an engagement end 78 of a working tip. Sleeve 77 is unscrewed and slid from around the engagement of the shaft and working tip when it is desired to change working tips. A portion of sleeve 77 may be flattened, if desired, to form wrench flats 79, FIG. 17, so that sleeve 77 can be tightened to front adapter 55 with a wrench, if desired.

Rather than a removable sleeve, the sleeve can be made retractable into the body of the drill or other tool with which the attachment system is used. Thus, the forward portion 80, FIGS. 10–15, of a power drill, such as a power drill similar to that shown as 50, FIG. 1, includes a bore 81, FIGS. 11 and 14, through which power drill shaft 82 passes after passing through bearing 83. Sleeve 85 has a shoulder 86 which slidingly fits into bore 81 with tabs 87, FIGS. 11 and 13, fitting into slots 88 to prevent rotation of the sleeve. A spring 89 is positioned in bore 81 between the end of bore 81 and sleeve shoulder 86 to bias sleeve 86 outwardly. Plug 90 is threaded into the front of bore 81 around sleeve 85 to hold sleeve shoulder 86 in bore 81 against the bias of spring 89. Plug 90 is tightened into the front of bore 81 by a spanner wrench by means of spanner wrench slots 91.

Under normal conditions, sleeve 85 is biased outwardly to the position shown in FIGS. 10 and 11 so that an inner bearing sleeve 93 surrounds the engagement ends of shaft 82 and a working tip 94 to hold working tip tongue 95 in shaft groove 96 and shaft tongue 97 in working tip groove 98 to hold the shaft and working tip in interengaged position. To lock the sleeve in extended position, circumferential locking slots 92, FIGS. 13 and 14, are provided at the forward end of slots 88 so that sleeve 85 can be rotated about 30° in a counterclockwise direction as shown in FIG. 13 to move tabs 87 from slots 88 into circumferential locking grooves 92. When it is desired to change the working tip, sleeve 85 is rotated to move tabs 87 into slots 88 and is then pushed inwardly into the forward portion 80 of the drill to the position shown in FIG. 14 to expose the engagement ends of working tip 94 and shaft 82. In this retracted position of the sleeve, the sleeve can be rotated through about 30° as shown by arrows 100, FIG. 15, to move tabs 87 on sleeve shoulder 86 into circumferential locking slots 101 at the back of slots 88 to hold sleeve 85 in retracted position. The outer end of sleeve 85 may be knurled as at 102, FIG. 10, to provide a gripping surface for a user to aid in rotation of the sleeve. The working tip is changed and held in interengaged position while sleeve 85 is released and allowed to move to extended position to thereby hold the new working tip in secured position to shaft 82. Sleeve 85 can then be rotated as described to lock it in extended position.

The engagement end of the shaft and working tip may be configured in various ways. The important thing is that rotation of the shaft be transferred to the working tip so that the working tip rotates with the shaft. FIGS. 18–21 show an alternate embodiment of shaft and working tip engagement where the engagement transfers rotational movement of the shaft to the working tip but does not otherwise secure the working tip to the shaft. Thus, the engagement end of shaft 115, FIGS. 19 and 21, is cut away to form a half round end portion 116 which mates with half round end portion 117 of an enlarged, engagement end portion 118 of working tip 119. With this arrangement, there is nothing in the engagement with the shaft to hold the working tip against forward axial movement with respect to the shaft. Thus, merely providing a straight cylindrical sleeve around the engagement of the shaft and working tip as in prior embodiments will not hold the working tip in engagement with the shaft as the working tip could slide forwardly out of the sleeve. To hold the working tip and shaft in engagement, the sleeve includes a shoulder 120 which abuts a shoulder 121 at the forward edge of working tip enlarged engagement end portion 118. The engagement of shoulders 120 and 121 maintains the working tip 119 in engagement with the tool shaft 115.

While a removable sleeve such as shown in the embodiments of FIGS. 1–9 or FIGS. 16–17 could be configured with a shoulder to hold the working tip in place, FIGS. 18–21 show a split sleeve embodiment of the invention. A rearward sleeve portion 125 is secured to the front portion 126 of a tool such as a power drill similar to that shown in FIG. 1. A half sleeve portion 127 extends forwardly of rearward sleeve portion 125 and has a mating half sleeve portion 128 hingedly secured thereto by hinge pin 129. An outer sleeve 130 fits over sleeve halves 127 and 128 when together as shown in FIGS. 18 and 19 and by solid lines in FIG. 20 to securely hold the sleeve halves together. Outer sleeve 130 may be secured in position over sleeve halves 127 and 128 by screwing it onto threads 131 at the rear of sleeve halves 127 and 128. Knurling 132 on the outside of outer sleeve 130 provides increased grip to a user for screwing outer sleeve 130 over sleeve halves 127 and 128. Sleeve half 127 has an inner bearing sleeve half 133, which extends into rearward sleeve portion 125 as full inner sleeve portion 134 to provide a bearing surface around shaft 115 and a mating inner bearing sleeve half portion 135 in sleeve half portion 128, in conjunction with mating inner bearing sleeve half portion 133, provides a bearing surface surrounding the engagement of shaft 115 and working tip enlarged engagement portion 118.

In use, when it is desired to change working tip 119, outer sleeve 130 is unscrewed and removed from around sleeve half portions 127 and 128 as shown in FIG. 21. Sleeve half portion 128 is pivoted downwardly about hinge pin 129 as shown in FIG. 21 and in broken lines in FIG. 20, and working tip 119 is removed from engagement with shaft 115. A different working tip can then be placed in sleeve half portion 127 in engagement with shaft 115, and sleeve half portion 128 swung upwardly about hinge pin 129 to closed position to capture working tip enlarged portion 118 between the closed sleeve halves. Outer sleeve 130 is secured in position over the closed sleeve halves 127 and 128 to securely hold the captured working tip in position.

Figures 22, 31, 32, 33, 34:
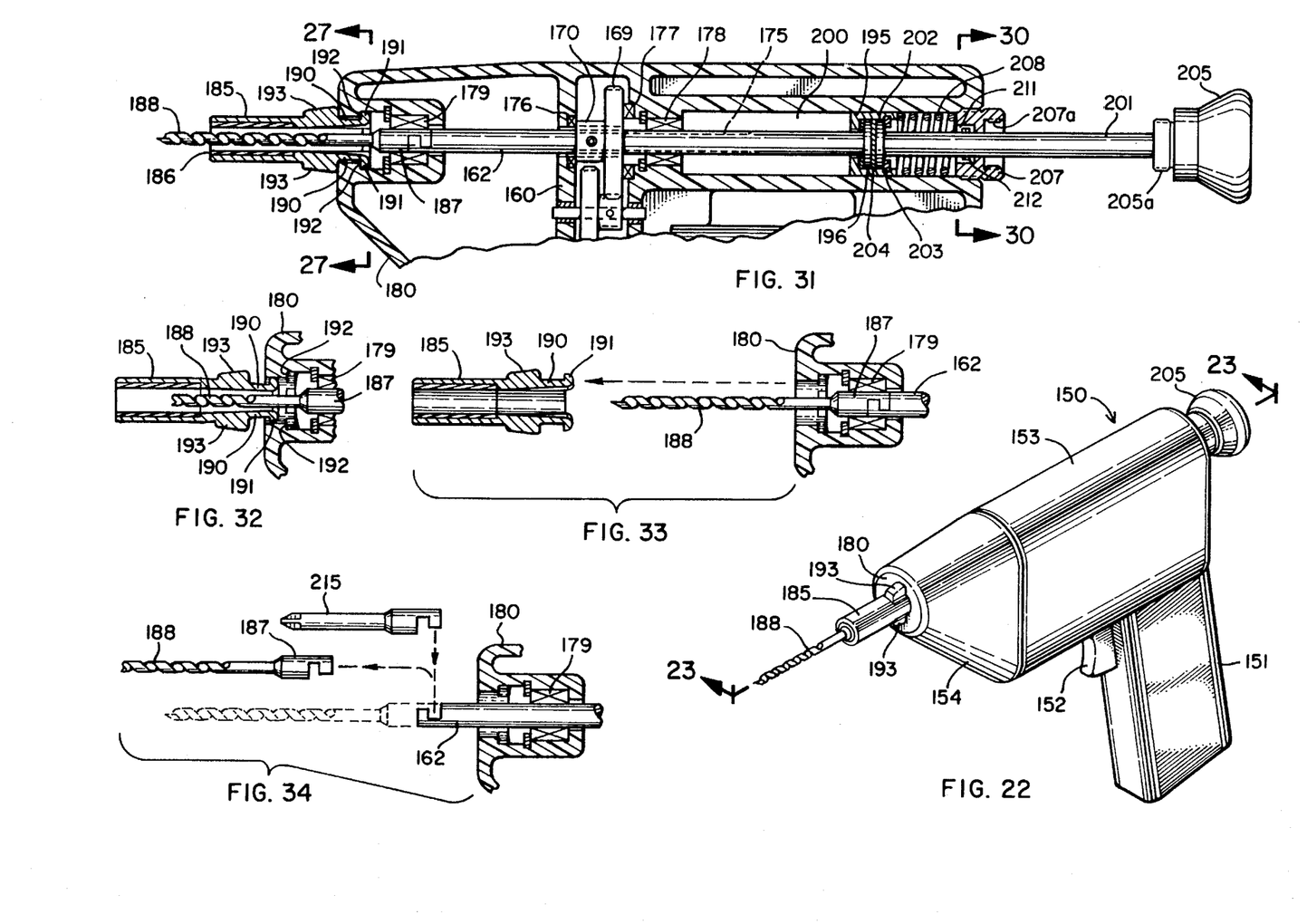
FIG. 22, a perspective view of a power drill of the invention with retractable shaft.
FIG. 31, a fragmentary vertical section similar to the upper portion of FIG. 23 showing the shaft in retracted position.
FIG. 32, a fragmentary vertical section of the front portion of the drill similar to the front portion of FIG. 31, but showing the sleeve partially removed.
FIG. 33, a fragmentary vertical section similar to that of FIG. 32, but showing the sleeve completely removed from the front portion of the drill and the shaft retracted.
FIG. 34, a fragmentary vertical section similar to that of FIG. 33 with the sleeve removed, but not showing the removed sleeve and showing the shaft extended so a working tip can be replaced.
Figures 23, 24, 25, 26, 27, 28, 29, 29A, 30:
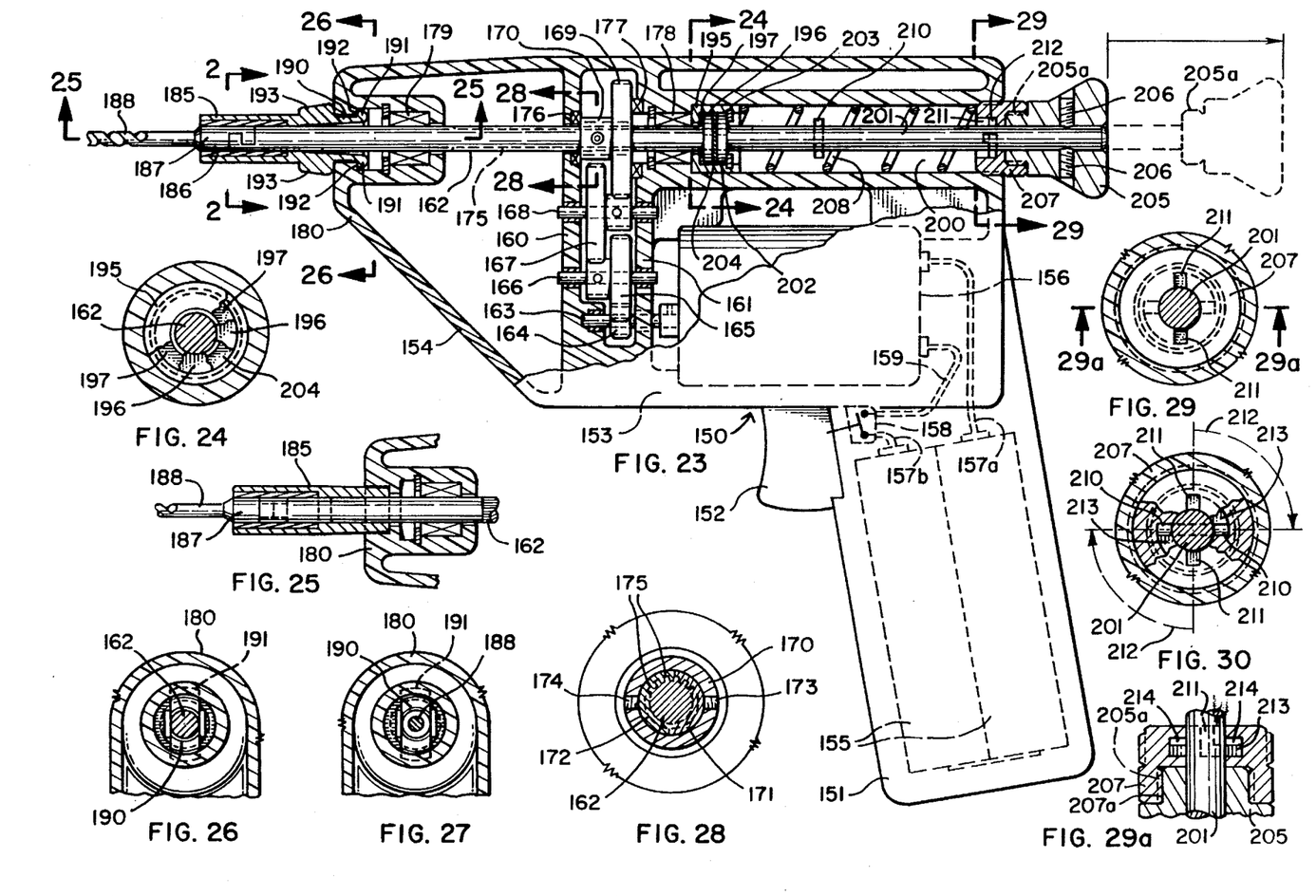
FIG. 23, a vertical section, partly in elevation, of the power drill of FIG. 22, showing the internal arrangement of significant parts.
FIG. 24, a vertical section taken on the line 24—24 of FIG. 23.
FIG. 25, a fragmentary transverse horizontal section taken on the line 25—25 of FIG. 23.
FIG. 26, a vertical section taken on the line 26—26 of FIG. 23.
FIG. 27, a vertical section taken on the line 27—27 of FIG. 31.
FIG. 28, a vertical section taken on the line 28—28 of FIG. 23.
FIG. 29, a vertical section taken on the line 29—29 of FIG. 23.
FIG. 29a, a horizontal section taken on the line 29a—29a of FIG. 29.
FIG. 30, a vertical section taken on the line 30—30 of FIG. 31.

FIGS. 22–34 show an embodiment of a power drill 150, FIGS. 22 and 23, of the invention which includes a retractable shaft. Drill 150 may be of various types, but is shown as a battery powered, portable drill having handle 151, trigger switch 152, body 153, and tapered front end 154. Rechargeable battery packs 155, as are standard in battery powered drills, are contained in handle 151 with wire 156 extending from battery pack 155 to motor 156 in drill body portion 153. Wire 157 extends to switch 158 with wire 159 extending from switch 158 to motor 156. As shown, switch 158 is coupled to trigger 152 so that it closes and causes operation of motor 156 when trigger switch 152 is operated. This represents a simple, single direction, single speed power drill, but other switches and wiring as are well-known could be used to provide variable speed and reversibility to the drill. Various types of torque adjusters, depth adjusters, and other controls could be provided.

Drill body 153 is molded to include central supporting webs 160 and 161, FIG. 23, to rotatably mount and support a reduction gear train for driving the drill shaft 162. Motor shaft 163 with gear 164 drives gear 165 mounted for rotation with shaft 166, which in turn drives gear 167 mounted for rotation with shaft 168, which in turn drives gear 169. Gear 169 includes sleeve 170 secured thereto into which mating spline receiving halves 171 and 172, FIG. 28, are positioned to surround and engage a splined portion of shaft 162 and are secured in sleeve 170 with set screws 173 and 174. Splines 175, FIGS. 23 and 28, extend along an intermediate portion of shaft 162 so that shaft 162 can slide axially with respect to gear 169, but will rotate with gear 169. Gear 169 and attached sleeve 170 are held in place by bearings 176 and 177.

Shaft 162 is supported by spaced bearings 178 and 179 and is slidably movable between an extended position shown in FIG. 23, and a retracted position shown in FIG. 31. In extended position shown in FIG. 23, the forward, working tip engaging end of shaft 162 extends through the front portion 180 of the drill into sleeve 185 which includes inner bearing sleeve 186, where it engages the rearward engagement portion 187 of working tip (drill bit) 188. The engagement of the shaft and working tip is shown as tongue and groove as previously described. Sleeve 185 includes rearwardly extending tabs 190 with walls 191 which engage shoulders 192 to secure sleeve 185 to the front portion of the drill. Operating pads 193 may be squeezed by a user to bend tabs 190 inwardly to release walls 191 from engagement with shoulders 192. However, with this embodiment, tabs 190 cannot be moved inwardly to release the sleeve from the front of the drill with shaft 162 extending therethrough. Shaft 162 and the engagement end portion 187 of working tip 188 have to be retracted in order to remove sleeve 185. This is a safety feature to prevent removal of sleeve 185 during operation of the tool. For this purpose, the rearward end of shaft 162 extends into coupling 195 and terminates in an enlarged disc 196. A thrust washer 197 is positioned as a bearing between disc 196 and coupling 195 so that shaft 162 and disc 196 can freely rotate within stationary coupling 195. Coupling 195 is slidably positioned in bore 200 which extends into drill body portion 153 from the rear thereof. A rod 201 extends from forward end disc 202 which is held in coupling 195 by retaining ring 203 with thrust washer bearing 204 between disc 202 and rotating disc 196, to a knob 205 secured to the rearward end of rod 201 by set screws 206. A plug 207 is threaded into the rear end of bore 200 and holds spring 208 compressed in bore 200. Spring 208 biases coupling 195 to the forward end of bore 200 as shown in FIG. 23, which extends shaft 162 from the forward end of the drill. To secure the shaft in extended position, in addition to the bias of spring 208, plug 207 is internally threaded at 207*a* and the end of knob 205 is matingly externally threaded at 205*a* so that knob 205 may be tightly screwed into plug 207 to securely hold knob 205, shaft 201, and shaft 162 in extended position shown in FIG. 23.

When it is desired to retract shaft 162, knob 205 is pulled rearwardly to move coupling 195 rearwardly against the bias of spring 208 to retracted position as shown in FIG. 31. As rod 201 is moved rearwardly to retracted position, pin 210 extending transversely therefrom intermediate its length enters receiving slots 211, FIGS. 23, 29, 30, and 31, and when moved into slots 211, handle 205 and rod 201 may be rotated approximately 90° as shown by arrows 212, FIG. 30, to rotate pin 210 in circumferential slots 213 and into forwardly extending pockets 214, FIG. 29*a*, at the end of circumferential slots 213 to lock shaft 162 in retracted position as shown in FIG. 31. With shaft 162 retracted, the engagement ends of shaft 162 and working tip 187 are drawn into bearing 179. Reduced diameter drill bit 188 is in sleeve 185 which allows tabs 190 to be flexed inwardly to clear shoulders 192 as shown in FIG. 32 to allow sleeve 185 to be removed from the forward end 180 of drill 150 as shown intermediately in FIG. 32, and completely removed in FIG. 33.

With sleeve 185 removed as shown in FIG. 33, shaft 162 can be extended as shown in FIG. 34 to release working tip 188 and replace it with an alternate working tip such as screwdriver tip 215. With the new tip in place, shaft 162 is withdrawn to retracted position to pull the engagement ends of the shaft and working tip into bearing 179 to hold the working tip in engaged position on the end of the shaft as shown in FIG. 33. Sleeve 185 is then reattached to the front portion 180 of the drill and shaft 162 extended to move the working tip to extend from the front of the sleeve into working position.

With the retractable shaft embodiment of a power drill, the drill can include a working tip storage cylinder as described in U.S. Pat. No. 4,572,038 to store a preselected assortment of working tips therein for immediate access by retracting the shaft from the cylinder, rotating the cylinder to the desired working tip, and then extending the shaft through the selected chamber of the cylinder with the desired tip secured thereto. By using the removable sleeve of the present invention in conjunction with the rotatable storage cylinder of U.S. Pat. No. 4,572,038, it is easy for a tool user to change the inventory of preselected working tips stored in the cylinder. Thus, a user can preselect and store a plurality of working tips in the cylinder anticipated as needed for a particular job, and then change those working tips to store other tips as anticipated as needed for another job. With the user changing the inventory of preselected tips, the cylinder should be configured so a user can see the particular tips that are stored in the cylinder to enable the user to select the desired tip. For this purpose, the cylinder can be made of a transparent material so the tips in the cylinder can be observed by a user, or preferably, the outer side of each storage chamber in the cylinder is open to allow observation of the tip stored in the chamber. The open side also allows debris to fall from the chamber and tip therein.

Figures 35, 36, 37, 38, 39:
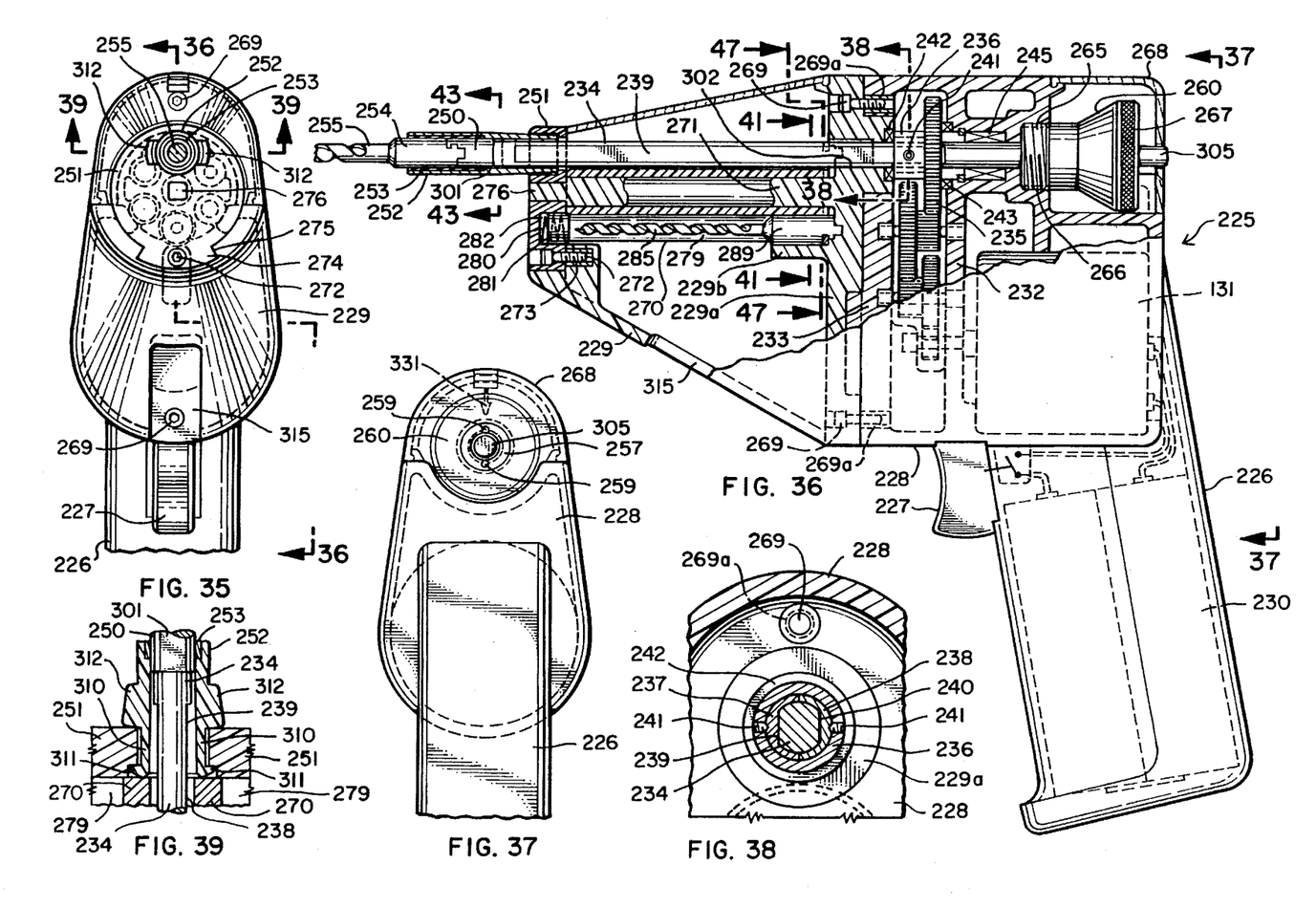
FIG. 35, a front elevation of a power drill of the invention having a storage cylinder for storage of working tips.
FIG. 36, a partial vertical section and partial side elevation of the drill of FIG. 35 taken on the line 36—36 of FIG. 35 and showing the shaft in extended position.
FIG. 37, a fragmentary rear elevation of the drill of FIG. 35, taken on the line 37—37 of FIG. 36.
FIG. 38, a fragmentary vertical section taken on the line 38—38 of FIG. 36.
FIG. 39, a fragmentary horizontal section taken on the line 39—39 of FIG. 35.

As shown in FIGS. 35–48, a battery-powered portable drill 225 has a handle 226, trigger switch 227, body 228, and tapered front end portion 229. Rechargeable battery packs 230 are contained in handle 226 and wired through trigger switch 227 to motor 231 similarly as shown for FIG. 27. Drill body 228 is molded similarly to drill body 153, FIG. 27, to include central supporting webs 232 and 233 which rotatably mount and support the gears of a reduction gear train for driving drill shaft 234 through gear 235 slidably mounted thereon. Gear 235 includes sleeve 236 secured thereto into which mating shaft holding halves 237 and 238, FIG. 38, are positioned to surround and engage flattened side portions 239 and 240 of shaft 234. Shaft holding halves 237 and 238 are held in sleeve 236 by set screws 241. With shaft holding halves 237 and 238 surrounding and engaging flattened side portion of shaft 234, shaft 234 can slide axially with respect to gear 235, but will rotate with gear 235. Gear 235 and attached sleeve 236 are held in place by bearings 242 and 243.

Figures 40, 41, 42, 43, 44, 45, 46:
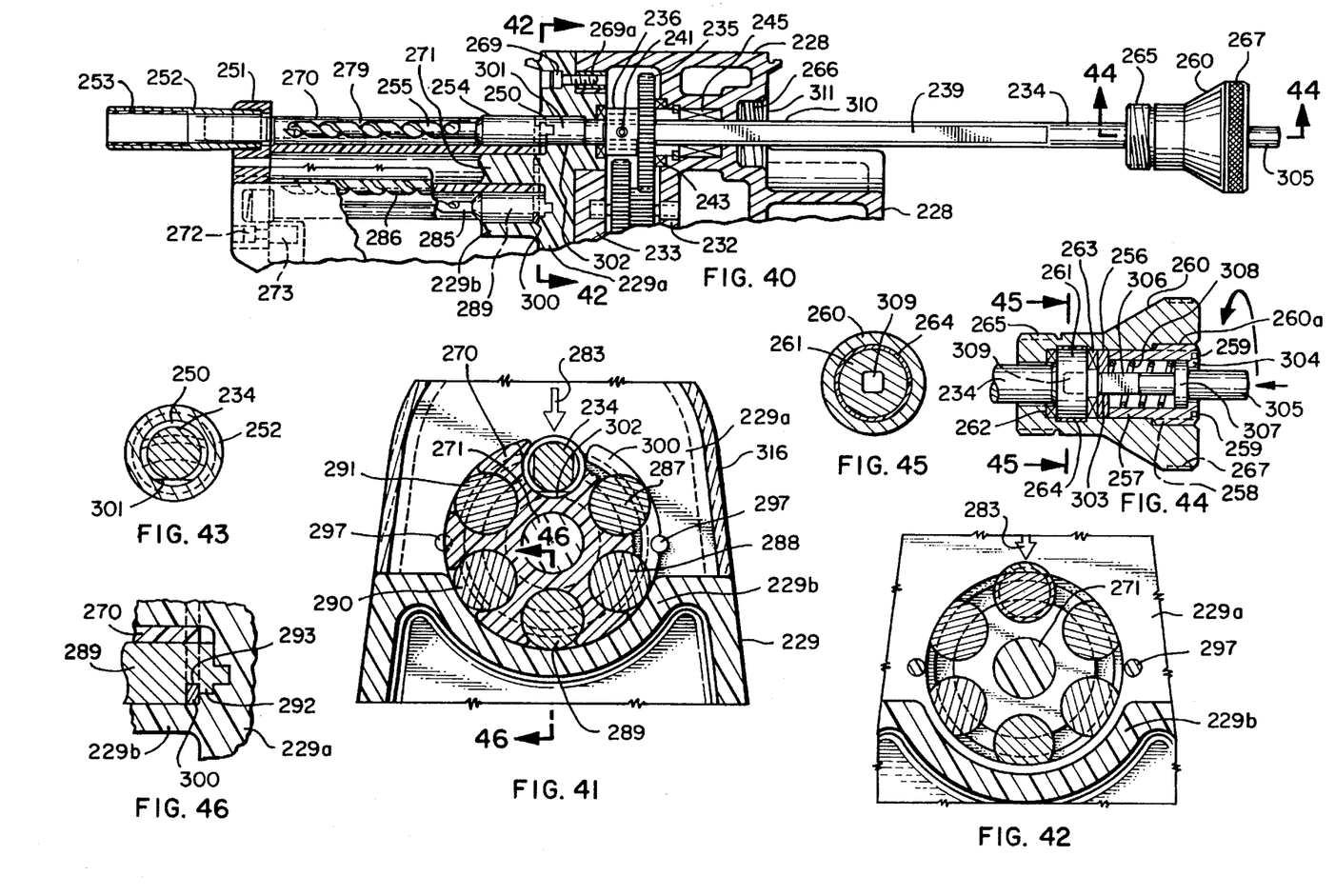
FIG. 40, a fragmentary vertical section of the top portion of the drill as shown in FIG. 36, but showing the shaft in retracted position.
FIG. 41, a fragmentary vertical section taken on the line 41—41 of FIG. 36.
FIG. 42, a fragmentary vertical section taken on the line 42—42 of FIG. 40.
FIG. 43, a vertical section through the shaft taken on the line 43—43 of FIG. 36.
FIG. 44, a fragmentary horizontal section through the knob of FIG. 40 taken on the line 44—44 of FIG. 40.
FIG. 45, a vertical section taken on the line 45—45 of FIG. 44.
FIG. 46, a fragmentary vertical section taken on the line 46—46 of FIG. 41.

Shaft 234 is supported by spaced bearings 242 and 245, FIGS. 36 and 40, and is slidably movable between an extended position shown in FIG. 36 and a retracted position shown in FIG. 40. In extended position shown in FIG. 36, the forward, working tip engaging end 250 of shaft 234 extends through front portion 251 of the drill into sleeve 252 which includes inner bearing sleeve 253, where it engages the rearward engagement portion 254 of working tip (drill bit) 255. The engagement of the shaft and working tip is shown as a modified tongue and groove arrangement.

The rearward end of shaft 234 extends into knob 260 and terminates in an enlarged disc 261, FIG. 44, rotatably mounted in knob 260 between bearings 262 and 263, with a bearing sleeve 264 surrounding disc 261. Bearing 263, and enlarged disc 261, are held in place in knob 260 by spacer 256 and cylindrical insert 257 having external threads 258 at the end thereof which mate with internal threads 260*a* of knob 260. Spanner wrench holes 259 allow insert 257 to be tightened into knob 260 using a spanner wrench. Forward end 265 of knob 260 is threaded and in extended position, this threaded portion is screwed into receiving threaded portion 266, FIG. 40, in drill body 228 to securely hold shaft 234 in its extended position. Knurling 267 provides a gripping surface for a user to grasp and rotate knob 260, and in extended position shown in FIG. 36, a removable cover 268, FIGS. 36 and 48, may be provided to cover the knob 260. Preferably, cover 268 is merely snapped into or off of the upper rear portion of drill body 228.

A working tip storage cylinder 270 is rotatably mounted in tapered front end portion 229 on shaft 271 extending forwardly from rearward wall 229*a* of tapered front end portion 229. Tapered front end portion 229 is secured to the forward end of body portion 228 by screws 269 threaded into sleeves 269*a* in body portion 228. Storage cylinder 270 is held in position on shaft 271 by front portion 251 secured to the forward end of tapered front portion 229 by screw 272 threaded into insert 273 molded into tapered front portion 229. Front portion 251 is located in tapered front end portion 229 by key 274, FIG. 48, which fits into receiving keyway 275. The forward end of shaft 271 is squared as at 276 to fit into square receiving opening 277 in front portion 229. With this arrangement, cylinder 270 is free to rotate in the drill about shaft 271. Working tip storage cylinder 270 includes a plurality of cylindrical storage chambers 279 extending the length of cylinder 270 and spaced, preferably equally, circumferentially around the cylinder 270. A rear wall extension 229*b* extends forwardly a short distance from rear wall 229*a* to cradle the lower half of the rear portion of cylinder 270. In some cases, it may be desirable to provide a spring 280 and rounded cap 281 in an opening 282 in front portion 251 so that cap 281 projects slightly into a cylindrical opening 279 when aligned therewith to provide a positive indication each time a storage chamber 279 is moved into alignment with cap 281. Cap 281 is positioned so that when a storage chamber 279 is aligned with cap 281, a storage chamber 279 is also aligned with tool shaft 234. Thus, the positive position indication given by cap 281 indicates alignment of a working tip with tool shaft 234. Such indication, however, is not necessary as a storage chamber 279 and working tip therein can be easily visually aligned by a user with tool shaft 234. Such visual alignment may be aided by an arrow 283.

Figures 47, 48:
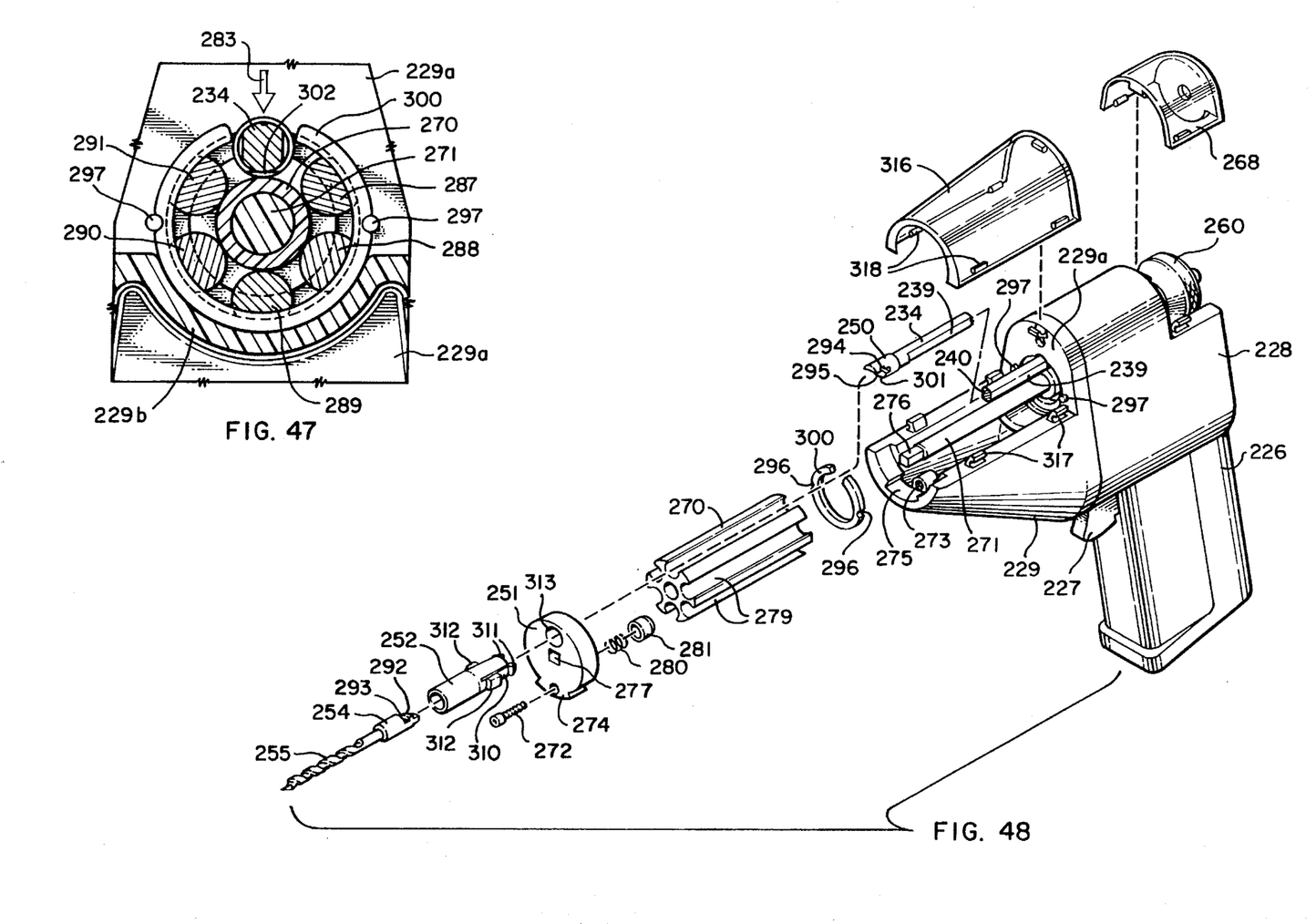
FIG. 47, a fragmentary vertical section taken on the line 47—47 of FIG. 36.
FIG. 48, an assembly view of the drill of FIGS. 35–47.

Each of the storage chambers 279 can hold a bit therein such as bits 285 and 286, FIG. 36, and as shown in FIGS. 35–48, the storage cylinder 270 has six storage chambers formed therein to hold six different bits. The attachment ends of these bits are shown in FIGS. 41, 42, and 47 as numbered 287, 288, 289, 290, and 291. Attachment end 289 is associated with bit 285 of FIG. 40 and attachment end 290 is associated with bit 286. As shown, the outer side of each storage chamber is preferably open so that the working tip stored in the chamber is visible to a user of the tool to aid the user in selection of the desired working tip and to allow any debris pulled into the chamber by a working tip, such as a drill bit, to fall from and not build up in the chamber.

Each attachment end of a bit includes a tongue portion 292 and groove portion 293, which, when attached to the attachment end 250 of drill shaft 234, mate with groove 294 and tongue 295. The bit tongue 292 and groove 293 and the shaft groove 294 and shaft tongue 295 are each cut on an arc as shown in FIGS. 41, 42, 43, and 47 so that storage cylinder 270 can be rotated (when shaft 234 is in retracted position shown in FIG. 40) and as it is rotated, tip tongue 292 will move into and through shaft groove 294 and tip groove 293 will move over and accept shaft tongue 295. If the storage cylinder 270 is stopped with a tip engagement end in line with shaft 234, shaft tongue 295 engages tip groove 293 while tip tongue 292 engages shaft groove 294. With a tip in this position aligned with shaft 234, shaft 234 can be extended to extend the tip from the drill as shown in FIG. 36.

It is important that the bits held in storage cylinder 270 are maintained with their tongues and grooves in proper orientation to mate with or pass through the mating groove and tongue of the shaft. To maintain this position, a partial ring 300 is positioned in forward body portion 229 at the rearward end of storage cylinder 270. Semicircular openings 296 in opposite sides of partial ring 300 position partial ring 300 with respect to posts 297 extending from rear wall 229a. The inner edge of partial ring 300 engages grooves 293 of the engagement ends of the bits and maintains the alignment so that tongue 292 always points radially outwardly from the center of the storage cylinder 270. In engaging tip grooves 293, partial ring 300 also holds the tips in position in respective cylindrical storage chambers 279. Partial ring 300 is open where shaft 234 extends to mate with a tip held in storage cylinder 270 so that during rotation of storage cylinder 270, a tip can pass from engagement with partial ring 300 to engagement with shaft tongue 295. It is thus important that when shaft 234 is fully retracted to the position shown in FIG. 40 to enable storage cylinder 270 to be rotated, it is always properly aligned with tongue 295 pointing radially inwardly toward the center of the storage cylinder. In order to achieve this alignment, the attachment end 250 of shaft 234 is of larger diameter than shaft 234 with a flat portion 301 aligned with tongue 295. A flat area 302 is provided where shaft 234 passes through the rear wall 229a of the forward body portion 229. With this arrangement, shaft 234 can only be fully retracted when shaft attachment portion flat portion 301 is aligned with flat portion 302. When these are aligned, shaft 234 can be fully retracted to the position shown in FIG. 40.

In order to properly align shaft 234 as it is retracted, spring loaded push button 305, FIG. 44, having a squared end 306, is positioned in cylindrical insert 257 with squared end 306 extending through a square receiving hole 303 in spacer 256. Spring 308 is positioned between push button shoulder 307 and spacer 256 to urge push button 305 outwardly to the position shown with shoulder 307 abutting insert end shoulder 304. The end of shaft enlarged disc portion 261 has a square hole 309 therein which receives the square end of push button 305 when it is depressed into knob 260 against the bias of spring 308. Knob 260 is rotated to align push button end 306 with opening 309 so that it is received therein. Push button 305 is mounted so that it does not rotate with respect to knob 260, but rotates therewith. In the embodiment shown, spacer 256 rotates with knob 260 and square end 306 in square receiving hole 303 causes push button 305 to rotate with knob 260. Thus, when push button square end 306 is received in shaft square opening 309, rotation of the knob 260 causes rotation of shaft 234. Shaft 234 may be mostly retracted without alignment necessary. Shaft 234 includes a mark 310 thereon, FIG. 40, which, when aligned with an arrow 311, FIGS. 40 and 37, when shaft 234 is in its mostly retracted position indicates the shaft 234 is properly rotated for full retraction. In this position, shaft 234 can be fully retracted and storage cylinder 270 rotated to change the tip on the shaft. While mark 310 and arrow 311 make alignment easier, they are not necessary as the shaft can be easily rotated to proper position merely by the interaction of shaft flat area 301 and housing flat area 302.

Similarly to embodiments previously discussed, sleeve 252 is removably mounted to the front of the drill, in the present embodiment to front piece 251. The rearward end of sleeve 252 includes a pair of tabs 310 with outwardly extending walls 311 and operating pads 312. The rearward end of sleeve 252 can be inserted in front end piece opening 313 with tabs 310 flexing inwardly so that walls 311 pass through opening 313. When walls 311 pass through opening 313, the tabs flex outwardly and walls 311 hold sleeve 252 securely in place on front piece 251. When it is desired to remove sleeve 252, operating pads 312 are squeezed inwardly to flex tabs 310 inwardly to allow walls 311 to pass through opening 313 and allow sleeve 252 to be removed.

Again, it should be noted that each of the storage chambers 279 is open to the outside of the storage cylinder so that any debris associated with a tip can fall from the opening and will not build up in the storage cylinder. To help ensure that all debris falls from the storage openings, an open slot 315, FIGS. 35 and 36, extends from around the lower part of the cylinder through forward body part 229. A forward removable cover 316, preferably transparent, may be provided to cover the upper portion of storage cylinder 270 during use of the tool. The provision of cover 316 is primarily for aesthetic purposes, but also serves to keep debris from falling on the cylinder 270 and the open storage chambers 279 during use. Cover 316 preferably snaps onto and off of front drill portion 229 with resilient body hooks 317 holding tabs 318 when the cover is in place.

While power drills have been illustrated and described herein, it should be realized that the removable sleeve of the invention can be used with a variety of both power and hand tools such as the screwdriver as shown in U.S. Pat. No. 4,572,038. Further, the attachment system is not limited to shafts which rotate, but could be used to attach working tips to tools having non-rotating or stationary tips. For example, it can be used to mount tips to reciprocating tools such as jig or saber saws, or to various other tools. Such tools may merely be handles to which a working tip is secured for manipulation.

FIGS. 49–53 show a manual screwdriver embodiment of the invention. Tool body 325 includes a shaft receiving portion 326, rear cylinder mounting end 327, cylinder shaft portion 328, and forward cylinder mounting end 329. Storage cylinder 330 is rotatably mounted on cylinder shaft portion 328, FIG. 51, between cylinder mounting ends 327 and 329. Storage cylinder 330 includes a plurality of storage chambers 331 spaced circumferentially therearound.

Screwdriver shaft 333 passes through shaft receiving portion 326 and includes a forward portion 334 of larger diameter than a rearward portion 335. Forward portion 334 has a flattened side 336 which mates with a flat side 337 of a shaft receiving hole through shaft receiving body portion 326. A screwdriver handle 340 is secured to the rearward end of rearward shaft portion 335.

A plurality of working tips 341 with tongue and groove engagement ends 342 adapted to mate with a forward engagement end 343 of shaft 333 are stored in storage cylinder 330, one tip being stored in each of the storage chambers 331. The tips are held in storage chamber 331 and kept in alignment by partial ring 345 which works similarly to partial ring 300 previously described.

A sleeve 346 is removably secured to forward cylinder mounting end 329 in alignment with body shaft receiving portion 326. Tabs with operating pads 347 such as previously described may be used to removably mount sleeve 346 in forward mounting end 329.

Figure 49:
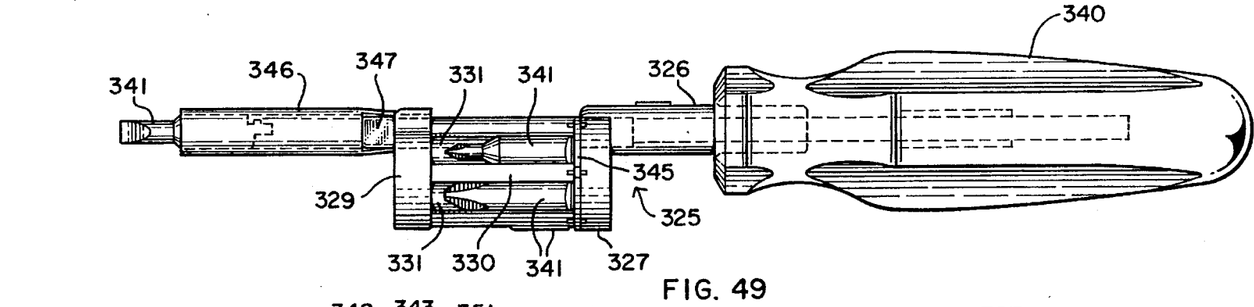
FIG. 49, a side elevation of a manual screwdriver of the invention having a storage cylinder for storage of working tips and showing the shaft extended.
Figure 50:
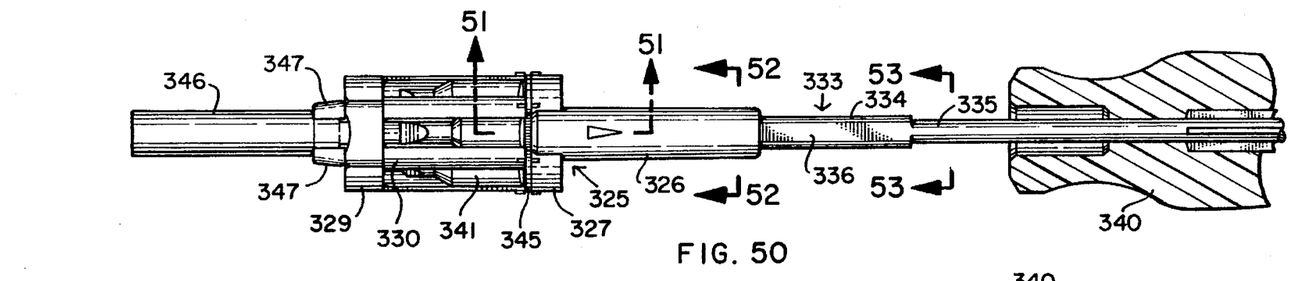
FIG. 50, a top plan view of the screwdriver of FIG. 49, showing the shaft retracted, and showing the handle fragmentarily.
Figure 51:
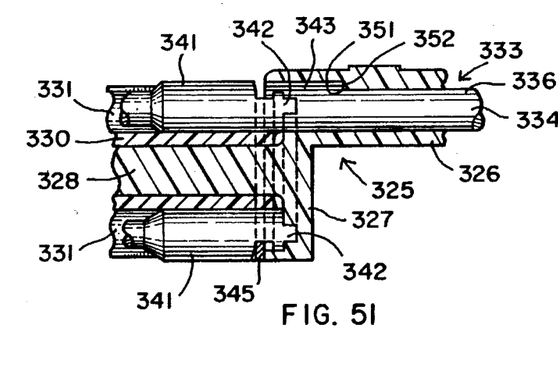
FIG. 51, a vertical section taken on the line 51—51 of FIG. 50.
Figure 52:
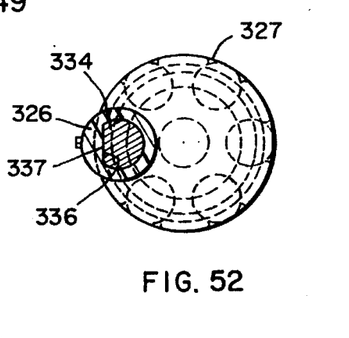
FIG. 52, a vertical section taken on the line 52—52 of FIG. 50.
Figure 53:
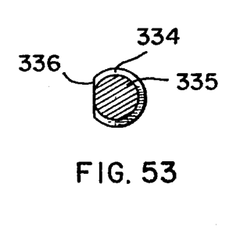
FIG. 53, a vertical section taken on the line 53—53 of FIG. 50.

To change a working tip mounted on shaft 333 among the working tips 341 stored in cylinder 330, and with the shaft in extended, operable position as shown in FIG. 49, handle 340 is rotated by a user to align shaft flat side 336 with shaft receiving body portion flat side 337 so that the shaft can be retracted through shaft receiving body portion 326 to retracted position shown in FIG. 50. The engagement end 343 of shaft 333 does not include flat side 336 and forms a shoulder portion 350, FIG. 51, which, with the shaft fully retracted, abuts a shoulder 352 in Shaft receiving body portion 326. In this position, storage cylinder 330 may be rotated to align a desired working tip 341 with shaft 333. When the desired tip is aligned with the shaft, handle 340 is moved forwardly in relation to body 325 to move the shaft to extended position wherein the working tip 341 extends from the forward end of sleeve 346. A user holds body 325 and rotates handle 340 (forward shaft portion 334 is no longer in the portion of the body having flat side 337, smaller rearward shaft portion 335 being freely rotatable therein) to rotate the working tip.

To replace or change working tips stored in storage cylinder 330, sleeve 346 is removed to expose the engagement of the working tip with the shaft, as for previous embodiments of the invention. This allows the working tip to be disengaged from the shaft and a new working tip to be engaged. Upon engagement of the new working tip, the sleeve is replaced to keep the working tip in secure engagement with the shaft.

The sleeve 346 may be removable with the shaft 333 in extended position as shown in FIG. 49, or, preferably, shaft 333 will need to be withdrawn to retracted position shown in FIG. 50 to allow sleeve 346 to be removed. With sleeve 346 removed, the shaft is extended to allow removal of and replacement of the working tip. With the tip replaced, the shaft is retracted to withdraw the replaced tip into storage cylinder 330. One or more of the tips stored in storage cylinder 330 may be replaced as desired.

It will be noted that storage chambers 331 have open sides so that the tools therein can be observed by a user and identified and so that debris can fall from such storage chamber. Further, there is no latch to latch the shaft in extended position. As long as shaft flat 336 is properly aligned with shaft receiving part flat 337, the handle 340 can be pulled rearwardly with respect to shaft receiving body part 326 to move the shaft to retracted position shown in FIG. 50. The use of shaft flat 336 and mating shaft receiving portion flat 337 ensures proper alignment and prevents retraction of the shaft in an improper orientation.

Whereas this invention is here illustrated and described with reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A tool having a shaft with a working tip receiving end adapted to removably engage a working tip to perform a job, wherein the working tip may be changed so that the tool is capable of performing different jobs depending upon the working tip engaged, and wherein the shaft moves during use of the tool with respect to a tool body which can be held and manipulated by a user, comprising:

a shaft having a working tip attachment end;

a tool body coupled to the shaft and by which the shaft can be manipulated and with respect to which the shaft moves during use of the tool; and a sleeve movable between a position wherein the sleeve surrounds the working tip attachment end of the shaft and is secured to the tool body so that the shaft moves within the sleeve, and a position removed from the working tip attachment end of the shaft;

whereby, when the sleeve surrounds the working tip attachment end of the shaft it will maintain a working tip in engagement with the shaft and when removed from the working tip attachment end, will allow disengagement of a working tip from the shaft.

2. A tool according to claim 1, wherein the sleeve is removably secured to the tool body so that when secured to the tool body, the sleeve surrounds the attachment end of the shaft.

3. A tool according to claim 2, wherein the sleeve snaps into securement with the tool body and includes means for releasing the securement.

4. A tool according to claim 3, wherein the sleeve includes resilient tabs extending from one end thereof having outward ends with radially extending walls extending radially outwardly therefrom and having a normal position, wherein the tool body includes a receiving opening therein around the shaft to receive the one end of the sleeve with shoulders to capture the radially extending walls when the tabs are in normal position, and wherein flexing of the tabs move the radially extending walls from capture by the shoulders to release the sleeve from the tool body.

5. A tool according to claims 2, wherein the sleeve includes a threaded end, wherein the tool body includes a threaded receiving opening therein around the shaft, and the sleeve is removably screwed into the receiving opening to secure it to the tool body.

6. A tool according to claim 2, wherein the attachment end of the shaft is retractable into the tool body to draw the attachment end of the shaft into the body of the tool, and any tip engaged thereby at least partially into the tool, and whereby the sleeve includes means for releasing securement to the tool body and such means are operable to release the sleeve from the body only when the shaft is retracted into the tool.

7. A tool according to claim 6, additionally including a tip storage cylinder mounted in the tool body in which a plurality of tips can be stored, wherein the attachment end of the shaft is retractable to a position to draw an engaged tip into a portion of the storage cylinder and in such position to allow rotation of the tip storage cylinder to remove an engaged tip from engagement with the attachment end of the shaft and move another tip into engagement with the attachment end of the shaft.

8. A tool according to claim 7, wherein the storage cylinder includes a plurality of open tip storage compartments so that any debris associated with a stored tip can fall free of the storage compartment.

9. A tool according to claim 8, wherein the attachment end of the shaft includes a tongue and groove which engages a mating groove and tongue on a tip.

10. A tool according to claim 1, wherein the sleeve is slidably mounted in the tool body to move between the position wherein it surrounds the working tip attachment end of the shaft and the position removed from the working tip attachment end of the shaft.

11. A tool according to claim 10, wherein the sleeve is slidably mounted to slide between an extended position wherein it surrounds the attachment end of the shaft and a retracted position removed from the attachment end of the shaft wherein a substantial portion of the sleeve is within the tool body.

12. A tool according to claim 11, wherein the sleeve is biased to extended position.

13. A tool according to claim 1, wherein the attachment end of the shaft is configured to engage a working tip in a manner to substantially prevent axial movement of an engaged working tip with respect to the shaft.

14. A tool according to claim 1, wherein the sleeve includes a shoulder therein to capture an enlarged working tip attachment end and substantially prevent axial movement of an engaged working tip with respect to the shaft.

15. A tool according to claim 1, wherein the movement of the shaft with respect to the tool body and the movement of the shaft within the sleeve is rotational movement.

16. In combination,
a tool having a shaft with a working tip receiving end adapted to removably engage a working tip to perform a job, wherein the working tip may be changed so that the tool is capable of performing different jobs depending upon the working tip engaged, and wherein the shaft moves during use of the tool with respect to a tool body which can be held and manipulated by a user, said tool comprising:
a shaft having a working tip attachment end;
a tool body coupled to the shaft and by which the shaft can be manipulated and with respect to which the shaft moves during use of the tool; and
a sleeve movable between a position wherein the sleeve surrounds the working tip attachment end of the shaft and is secured to the tool body so that the shaft moves within the sleeve, and a position removed from the working tip attachment end of the shaft;
whereby, when the sleeve surrounds the working tip attachment end of the shaft it will maintain a working tip in engagement with the shaft and when removed from the working tip engagement end, will allow disengagement of a working tip from the shaft; and
a working tip having an attachment end adapted to mate with the attachment end of the shaft, said working tip attachment end being engaged with the attachment end of the shaft and being held in engagement with the attachment end of the shaft by the sleeve in position to surround the working tip attachment end of the shaft.

17. A combination according to claim 16, wherein the attachment end of the shaft includes a tongue and groove which engages a mating groove and tongue on the tip.

18. A combination according to claim 16, wherein the attachment end of the shaft is of substantially half round configuration, and wherein the attachment end of the working tip is of mating substantially half round configuration and is enlarged to be held by the sleeve against substantial axial movement in relation to the shaft.

19. A combination according to claim 18, wherein the sleeve is split longitudinally and wherein the position of the sleeve removed from the working tip attachment end of the shaft is a position of the sleeve wherein it is opened along the split so that it does not totally surround the shaft.

20. A tool having a shaft with a working tip receiving end adapted to removably engage a working tip to perform a job, and wherein the working tip may be changed so that the tool is capable of performing different jobs depending upon the working tip engaged, comprising:
a shaft having a working tip attachment end;
a tool body coupled to the shaft and by which the shaft can be manipulated; and
a sleeve movable between a position wherein the sleeve surrounds the working tip attachment end of the shaft and is snapped into securement to the tool body, and a position removed from the working tip attachment end of the shaft, said sleeve including means for releasing the securement to the tool body;
whereby, when the sleeve surrounds the working tip attachment end of the shaft it will maintain a working tip in engagement with the shaft and when removed from the working tip attachment end, will allow disengagement of a working tip from the shaft.

21. A tool having a shaft with a working tip receiving end adapted to removably engage a working tip to perform a job, and wherein the working tip may be changed so that the tool is capable of performing different jobs depending upon the working tip engaged, comprising:
a shaft having a working tip attachment end;
a tool body coupled to the shaft and by which the shaft can be manipulated;
means for retracting the shaft into the tool body to draw the attachment end of the shaft into the body of the tool, and any tip engaged thereby at least partially into the tool; and
a sleeve removably secured to the tool body wherein when the sleeve is secured to the tool body and the shaft is in an extended position, the sleeve surrounds the working tip attachment end of the shaft, said sleeve having means for releasing securement of the sleeve to the tool body operable to release the sleeve from the tool body only when the shaft is in the retracted position;
whereby, when the sleeve surrounds the working tip attachment end of the shaft it will maintain a working tip in engagement with the shaft and when removed from the tool body and the shaft is in extended position, will allow disengagement of a working tip from the shaft.

22. A tool having a shaft with a working tip receiving end adapted to removably engage a working tip to perform a job, and wherein the working tip may be changed so that the tool is capable of performing different jobs depending upon the working tip engaged, comprising:

a shaft having a working tip attachment end;

a tool body coupled to the shaft and by which the shaft can be manipulated; and a sleeve slidably mounted in the tool body to move between a position wherein the sleeve surrounds the working tip attachment end of the shaft and is secured to the tool body, and a position wherein a substantial portion of the sleeve is within the tool body and the sleeve is removed from the working tip attachment end of the shaft;

whereby, when the sleeve surrounds the working tip attachment end of the shaft it will maintain a working tip in engagement with the shaft and when removed from the working tip attachment end, will allow disengagement of a working tip from the shaft.

23. A tool having a shaft with a working tip receiving end adapted to removably engage a working tip to perform a job, and wherein the working tip may be changed so that the tool is capable of performing different jobs depending upon the working tip engaged, comprising:

a shaft having a working tip attachment end;

a tool body coupled to the shaft and by which the shaft can be manipulated; and a sleeve movable between a position wherein the sleeve surrounds the working tip attachment end of the shaft and is secured to the tool body, and a position wherein the sleeve does not surround the working tip attachment end of the shaft, said sleeve including a shoulder therein;

whereby, when the sleeve surrounds the working tip attachment end of the shaft it will maintain a working tip with an enlarged working tip attachment end in engagement with the shaft and the sleeve shoulder will capture the enlarged working tip attachment end and substantially prevent axial movement of the engaged working tip with respect to the shaft, and when it does not surround the working tip attachment end, will allow disengagement of a working tip from the shaft.

24. A tool according to claim 23, wherein the sleeve is split longitudinally and wherein the position of the sleeve wherein the sleeve does not surround the working tip attachment end of the shaft is a position of the sleeve wherein it is opened along the split.

* * * * *